INVENTOR.
WILLIAM A. RHEINFELDER
By White & Haefliger
ATTORNEYS.

INVENTOR
WILLIAM A. RHEINFELDER
By White & Haefliger
ATTORNEYS.

United States Patent Office 3,451,003
Patented June 17, 1969

3,451,003

CABLE TELEVISION AMPLIFIER GAIN AND TILT CONTROL

William A. Rheinfelder, South Laguna, Calif., assignor, by mesne assignments, to Anaconda Electronics Company, Anaheim, Calif., a corporation of Delaware Filed June 8, 1966, Ser. No. 556,160
Int. Cl. H03g *3/30;* H03f *3/10, 3/68*
U.S. Cl. 330—21 12 Claims

ABSTRACT OF THE DISCLOSURE

The disclosure concerns the provision, in a cable television system, of an amplifier or amplifiers having gain compensated tilt control, and tilt compensated gain control.

This invention relates generally to cable television, and more specifically concerns cable television amplifier gain and tilt control.

In multi-channel cable television system, TV signals are repeatedly amplified in cascaded amplifiers so as to compensate for the normal distribution losses in signal strength. Upon installing or servicing such amplifiers in the field, adjustments are often needed to set amplifier gains, so as to meet specific system requirements. Analysis shows that amplifier gain should change differently at different signal frequencies so as to maintain correct equalization for cable losses at all times. For example, gain control should provide about twice as much change in gain at channel 13 as at channel 2, with proportionate change at intermediate TV channels or frequencies. Such control is here called tilt-compensated gain control because it changes tilt (response or gain level as between channels 2 and 13), simultaneously with gain to correctly equalize or compensate for different lengths of cable, at all times. In the past, equalization has required adjustment of several interdependent controls or trimmers, leading to undesirable interaction of the effects of such adjustments so that accuracies of greater than 30% were not achievable. In addition to this, it is often necessary to adjust both gain and frequency response, such an adjustment being even more difficult to make with accuracy when multiple controls are used.

The present invention has for its major object the elimination of above-mentioned difficulties through the provision of a single gain control that is tilt compensated for changing tilt simultaneously with gain; and in addition, another important aspect of the invention concerns the provision of a single tilt control that is gain compensated so as to change relative gain between two TV channels, i.e. the frequency response of the amplifier, these objects being achieved in an unusual manner.

Basically, and as regards tilt compensated gain control, the invention is characterized by one or more improved wide band solid state amplifiers connectible with a cable transmitting multiple channel television signals, the signals of higher frequency in the band being subject to greater attenuation than the signals of lower frequency in the band, thereby to define tilted attenuation levels corresponding to the effective spacing between successive amplifiers. The amplifier, or each of the amplifiers, has intercoupled amplification stages operable to amplify the signals of higher frequency with more gain than the signals of lower frequency thereby to define tilted gain level, and the amplifier has certain controllable impedance that is variable to establish a range of amplifier gain levels having different slopes at a selected pilot frequency within the band; further one of the gain levels has substantially matching correspondence to an attenuation level established by the effective spacing of the amplifier from the previous amplifier in the system, and a single control for the controllable impedance facilitates rapid selection of the one gain level for best matching to the established tilted attenuation level. Typically, the amplification stages include transistors having input and output paths, and the controllable impedance comprises variable capacitance connected in shunt with the input path of a transistor in a stage other than the first stage of the amplifier, as will be described.

As concerns the gain compensated tilt control aspect of the invention, the amplifier as described above includes other impedance that is variable to change the slopes of the gain levels while maintaining the gain levels substantially fixed to "hinge" at the pilot frequency, preferably channel 13 for greater accuracy; further, a single control for the slope varying impedance facilitates rapid adjustment of slope entirely independently of gain level control, particularly during installation and maintenance of the equipment. Typically, the slope varying impedance comprises variable capacitance connected in series with the output path of a transistor other than in the last stage of the amplifier. Results include provision for larger cascades of amplifiers in the distribution system, and better performance in terms of less distortion and noise.

These and other objects and advantages of the invention, as well as the details of illustrative embodiments, will be more fully understood from the following detailed description of the drawings, in which.

Figure 1:
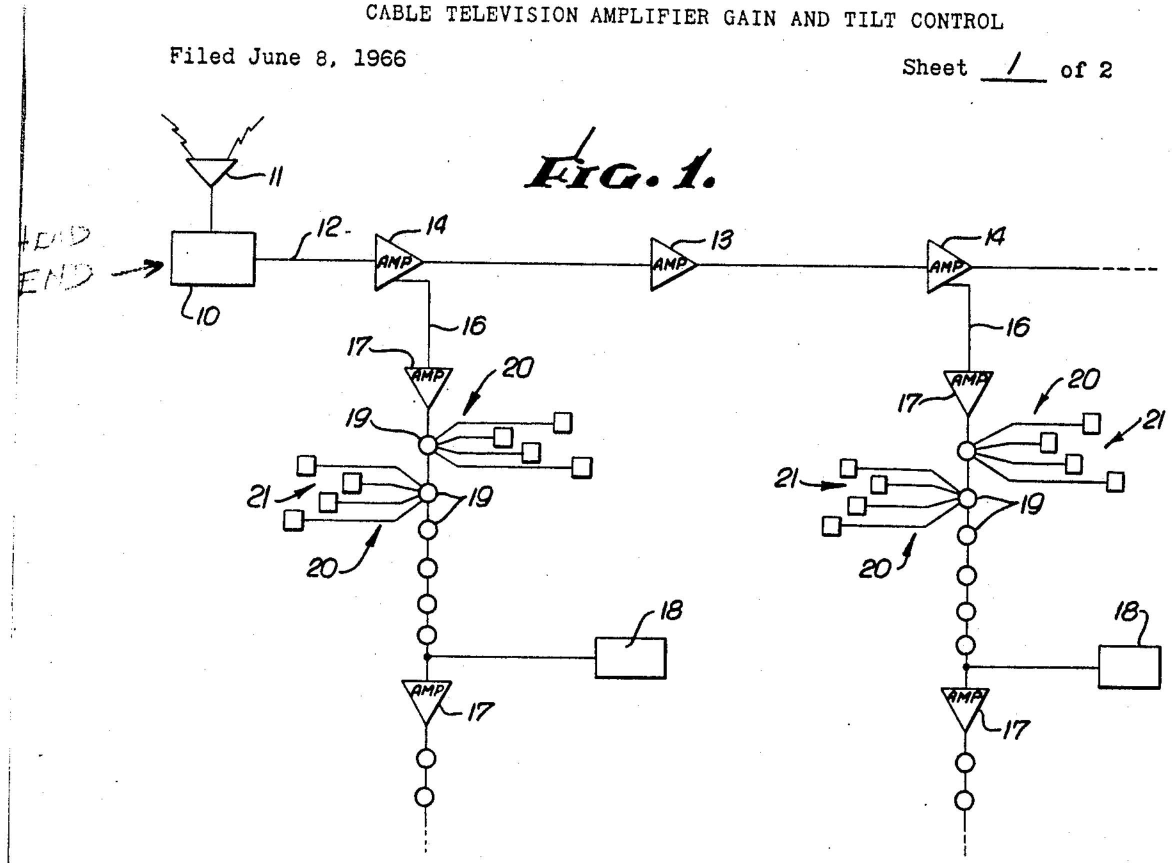
FIG. 1 is a generalized block diagram showing a portion of a cable television system.

Referring first to FIG. 1, the illustrated cable television system includes head end equipment 10 with antenna 11 to pick up broadcast multi-channel television signals. Such equipment is known and is operable to correct and adjust the signal level for each channel, with separate correction for picture and sound carriers. Such equipment also typically includes preamplifiers, demodulators, modulators for each channel, together with a multichannel combining network, the output of which is applied outputs 20 to which individual home receivers 21 are connected, such taps being known devices. For example, a to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers feeder lines 15 are run along a row of subscribers' houses. The feeder lines include coaxial cable 16 and line extended amplifiers 17 operable to line extender amplifiers. Power to the cables is supplied at permissible levels as by the transformers or other sources 18. Between successive amplifier 17 directional taps or couplers 19 are provided, typically with multiple compensate for the loss in the feeder system. As an example, each feeder line may include four to ten or more four-house tap is typically used every 150 feet.

Figure 2:
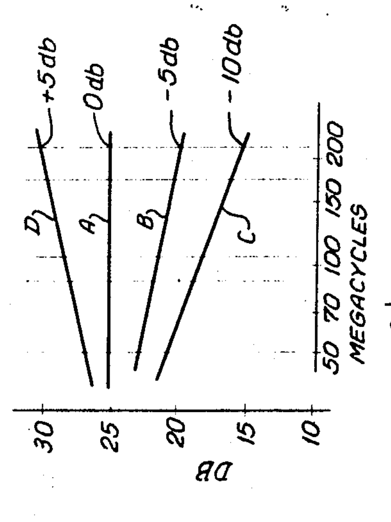
FIG. 2 is a graph showing action of tilt-compensated gain control.

FIG. 2 illustrates the action of tilt-compensated gain control used to compensate for different degrees of tilted attenuation resulting from different effective cable lengths between amplifiers. This control changes the amplifier response simultaneously with gain so that different lengths of cable are accurately equalized without the further adjustment of another control; for example, the change in gain at channel 13 is about twice that at channel 2, and all other channels are proportionately changed. For example, reducing the gain by 10 db at channel 13 (the pilot frequency), causes a reduction in gain of only about 5 db at channel 2, as is clear from tilted gain level C. Other tilted gain levels are seen at B and D, level A representing a flat alignment with 25 db of gain to exactly match a theoretical 25 db of signal attenuation in the cable between successive amplifiers. Tilted levels B, C and D represent gain to match tilted attenuation levels that differ due to errors in amplifier spacing, cable temperature changes, or aging. In accordance with an important aspect of the invention, a single control is operable at an amplifier 13, 14 or 17 and in such a way as to control a variable impedance that establishes the range of amplifier gain levels having different slopes at a pilot frequency, channel 13 being preferred due to greater measurement accuracy. Preferably each of the distribution amplifiers has such a control.

Figure 3:
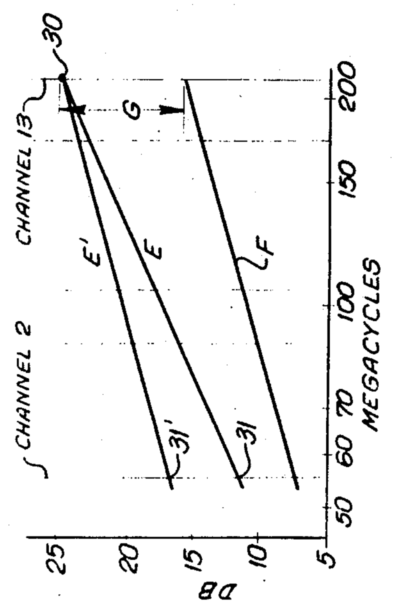
FIG. 3 is a graph showing action of tilt control.

Another important aspect of the invention concerns the provision in at least one of the amplifiers 13, 14 and 17, and preferably in each of the distribution amplifiers 17, of other impedance that is variable by means of a single control to change the slopes of the selectable gain levels such as B, C and D, while maintaining such levels substantially fixed at the pilot frequency. FIGURE 3 illustrates such a gain compensated tilt control, with gain of level E is adjusted to level E', increasing the gain at channel 2 by 5 db, i.e. that gain moves from point 31 to point 31'. Such a tilt control permits ready adjustment of the proportion of flat gain (gain at all frequencies adjusted by the same amount) to equalized gain (gain at different frequencies adjusted by different amounts to equalize and compensate for attenuation along the cable) without affecting total gain at the pilot frequency. Thus in FIG. 3, level E' is the sum of level F (the amount of equalized gain, i.e. 15.5 db at channel 13) plus an amount of flat gain G (9.5 db at all frequencies). Equalization for only 15.5 db of cable is provided, represented by level E', as compared with equalization for 25 db of cable, represented by level E. Note that if the hinge or tilt point were at a frequency other than the highest or lowest channel in the band, gain would be reduced at some frequency and increased at others, making a further gain adjustment necessary.

Figure 4:
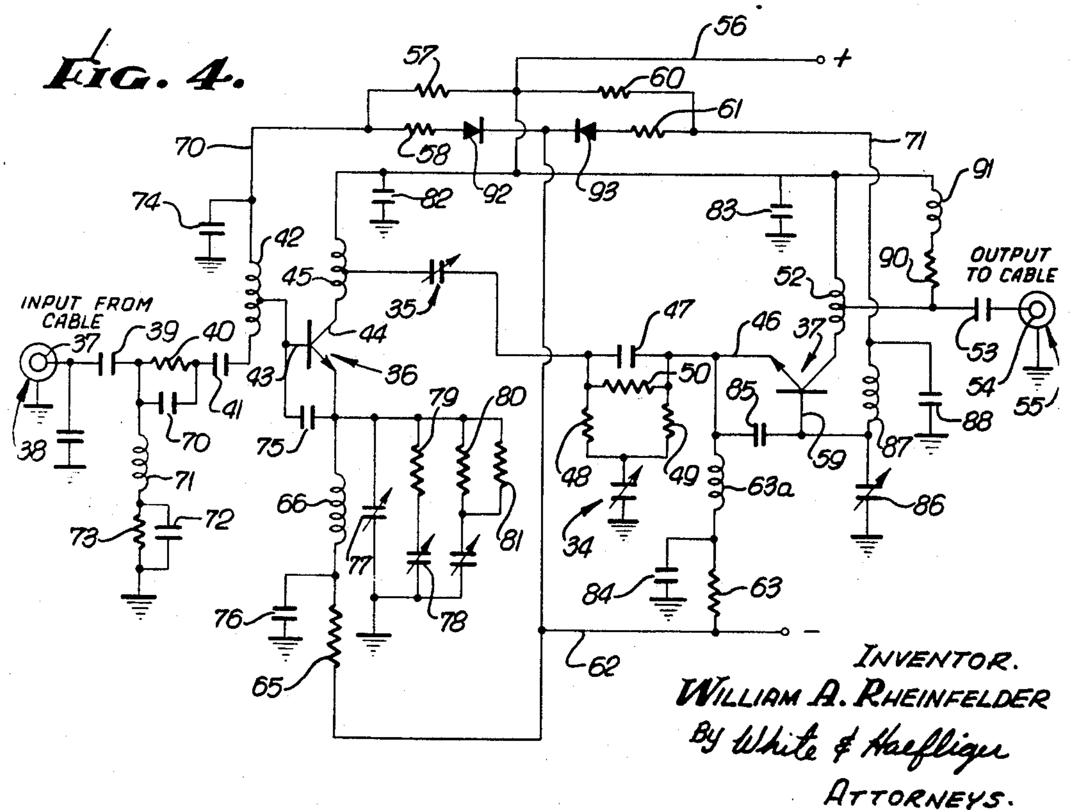
FIG. 4 is an amplifier circuit diagram showing tilt-compensated gain controlling impedance and gain-compensated tilt controlling impedance.

FIG. 4 illustrates one form of amplifier incorporating both tilt compensated gain control, as exemplified by variable capacitance 34, and gain compensated tilt control, as exemplified by variable capacitance 35. The amplifier has interconnected amplification stages, as represented by transistors 36 and 37. The input path to base electrode 43 of transistor 36 includes the center conductor 37 of the coaxial cable 38, and coupling capacitor, resistor and choke elements 39–42. Variable capacitor 35 is connected in series with the output path from collector electrode 44 of transistor 36, that path including choke 45.

Variable capacitor 34 is connected *in shunt with* the input path to emitter electrode 46 of second stage transistor 37, that path including coupling capacitor 47. The shunt circuit in which variable capacitance 34 is incorporated includes resistances 48–50 connected in the network configuration shown. The output path from collector electrode 51 of transistor 37 includes choke 52 and coupling capacitor 53, to which the center conductor 54 of the next run of cable 55 is connected.

Bias for base electrode 43 is provided by dropping collector voltage at 56 through divider resistances 57 and 58 for application via lead 70, and likewise bias for base electrode 59 of transistor 37 is provided by dropping voltage at 56 through divider resistances 60 and 61 for application via lead 71. Negative voltage terminal 62 has connection with emitter 46 via resistor 63 and choke 63*a*, and with emitter electrode 64 of transistor 36 via resistor 65 and choke 66.

Additional components of the FIG. 4 circuit are identified as shown, and circuit components may have values as follows, these being merely illustrative:

| Item: | Type or value |
|---|---|
| Transistors— | |
| 36 | 2N3866. |
| 37 | 2N3866. |
| Resistors— | |
| 40 | 75Ω. |
| 73 | 75Ω. |
| 65 | 20Ω. |
| 79 | 33Ω. |
| 80, 81 | 10Ω. |
| 48 | 75Ω. |
| 49 | 150Ω. |
| 50 | 120Ω. |
| 63 | 15Ω. |
| 90 | 100Ω. |
| 57 | 1.1K. |
| 58 | 120Ω. |
| 60 | 1.2K. |
| 61 | 120Ω. |
| Capacitors— | |
| 39, 41, 74, 76, 82, 83, 84, 88, 53 | .001 μfd. |
| 70 | 33 pfd. |
| 72 | 22 pf. |
| 75 | 10 pf. |
| 77, 78 | 15 to 60 μfd. |
| 35 | 15 to 60 μfd. |
| 47 | 27 pf. |
| 34 | 8–50 pf. |
| 85 | 10 pf. |
| 86 | 15 to 60 μfd. |
| Coils— | |
| 71 | RFC, 8 turns. |
| 42 | Transformer, 4+4 turns. |
| 66 | RFC, 10 turns. |
| 45 | Transformer, 4+4 turns. |
| 63*a* | RFC, 10 turns. |
| 87 | RFC, 10 turns. |
| 52 | Transformer, 4+4 turns. |
| 91 | RFC, 8 turns. |
| Diodes— | |
| 92 | IN67. |
| 93 | IN67. |

Figure 5:
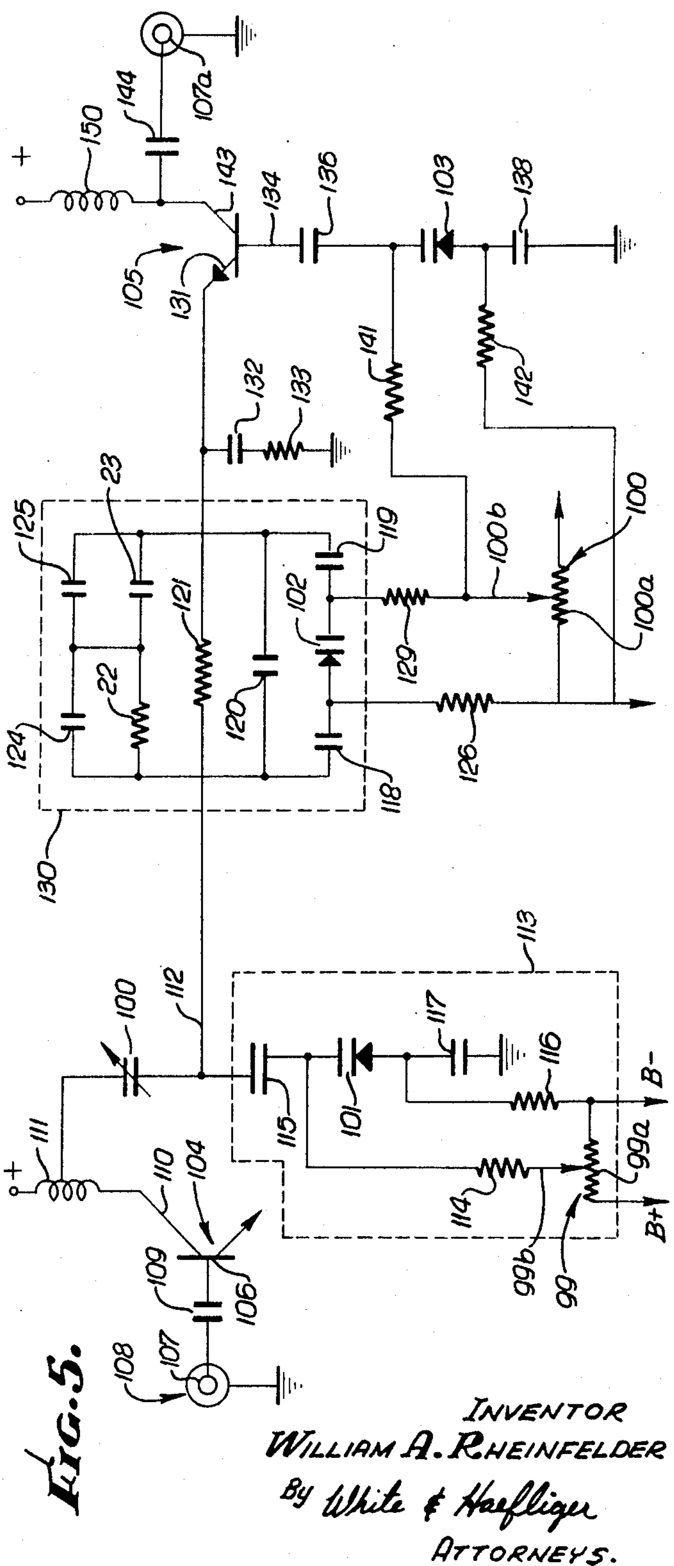
FIG. 5 is another amplifier circuit diagram showing tilt-compensating gain controlling impedance and gain-compensated tilt controlling impedance.

FIG. 5 illustrates another form of amplifier incorporating both tilt-compensated gain control, and gain compensated tilt control, as exemplified by controllable potentiometers 99 and 100. Note also the voltage-controlled capacitance diodes 101, 102 and 103 which are proportioned and electrically interconnected in such manner as to facilitate desired tilt compensated gain control and gain compensated tilt control. For example, adjustment of potentiometer 99 achieves tilt-compensated gain control, as seen in FIG. 2 to compensate for different losses due to different effective cable lengths; also, adjustment of potentiometer 100 achieves gain compensated tilt control as exemplified by level E' in FIG. 3.

The FIG. 5 amplifier has interconnected amplification stages as represented by transistors 104 and 105. The input path to base electrode 106 of transistor 104 includes center conductor 107 of coaxial cable 108, and coupling capacitor 109. Variable capacitor 100 is connected in series with the output path 112 from collector electrode 110 of transistor 104, that path including choke 111.

The tilt control network 113 is connected in shunt with output path 112, and includes the potentiometer 99 having variable resistor 99*a* connected between B+ and B− voltage terminals. The wiper arm 99*b* is connected through resistance 114 and capacitor 115 with path 112; also path 112 is connected with B— through capacitor 115, diode 101, and resistance 116. Note also capacitance 117. Thus, the capacitance of shunt connected diode 101 is voltage-controlled by the potentiometer 99, for gain compensated tilt control.

Tilt compensated gain control is achieved by adjustment of potentiometer 100 to voltage control the capacitance of diode 102 connected in series with the output path 112. That diode, together with capacitors 118 and 119, forms one branch of a network 130, other parallel branches of which include capacitor 120, resistor 121, resistor and capacitor 122 and 123 and capacitors 124 and 125. B— voltage is applied to one side of diode 102 via resistor 126, and higher voltage than B— is applied to the opposite side of the diode via potentiometer resistor 100*a*, wiper arm 100*b*, and resistor 129. Network 130 is connected in path 112 at the input side of the emitter 131 of transistor 105. Note also, shunt capacitor 132 and resistor 133 at that side.

Finally, the base electrode 134 of transistor 105 is connected in series with capacitor 136, variable capacitance diode 103 and capacitor 138. Again, the capacitance of diode 103 is controlled by the same differential voltage as is applied across diode 102, as via connections 139 and 140 containing resistors 141 and 142, to achieve desired control. The output taken from collector 143 of transistor 105 is passed via coupling capacitor 144 to the cable center conductor 107*a*.

Circuit components of the FIG. 5 circuit may have values as follows, these being merely illustrative:

| Item: | Type in value |
|---|---|
| Transistors— | |
| **104** | 2N3866. |
| **105** | 2N3866. |
| Resistors— | |
| **99***a*, **100***a* | 10Ω. |
| **114, 116, 126, 129, 141** | 100Ω. |
| **121** | 180Ω. |
| **133** | 39Ω. |
| **122** | 560Ω. |
| Capacitors— | |
| **100** | 15–60 pf. |
| **109, 115, 117, 118, 119, 136, 138, 144** | .001 μfd. |
| **124** | 18 μfd. |
| **125** | 22 μfd. |
| **123** | 68 μfd. |
| **120** | 8.2 μfd. |
| **132** | 22 μfd. |
| Coils— | |
| **111** | 8 turns, center tapped. |
| **150** | 10 turns, RFC. |
| Diodes— | |
| **101, 102** | V–10. |
| **103** | V–27. |
| Voltage— | |
| B+ | +15 volts. |
| B— | —15 volts. |

I claim:

1. In a cable television system, a cable to transmit multiple channel television band signals for reception by subscriber equipment, and multiple wide-band R.F. amplifiers electrically connected with the cable at spaced locations to amplify the transmitted multiple channel signals, the signals of higher frequency in the band being subject to greater attenuation than the signals of lower frequency in the band during transmission of all multiple channel signals between amplifiers, thereby to define tilted attenuation levels corresponding to the effective spacing between successive amplifiers, an amplifier having intercoupled amplification stages operable to amplify said signals of higher frequency with more gain than said signals of lower frequency thereby to define tilted gain levels, the amplifier having certain controllable impedance that is variable to establish a range of amplifier gain levels having different slopes at a selected pilot frequency within the band, one of said gain levels having substantially matching correspondence to an attenuation level established by the effective spacing of said amplifier from the previous amplifier in the system, and a single control for said impedance, the amplifier also including other impedance that is variable to change the slopes of the gain levels while maintaining the gain levels substantially fixed at the pilot frequency, and a single control for said other impedance.

2. The system of claim 1, in which each of said amplifiers has intercoupled amplification stages with controllable impedance in the form of varible capacitance.

3. The system of claim 1, wherein said stages include transistors having input and output paths, said controllable impedance comprising variable capacitance connected in shunt with the input path of a transistor in a stage other than the first stage of the amplifier.

4. In a cable television system, a cable to transmit multiple channel television band signals for reception by subscriber equipment, and multiple wide-band R.F. amplifiers electrically connected with the cable at spaced locations to amplify the transmitted multiple channel signals, the signals of higher frequency in the band being subject to greater attenuation than the signals of lower frequency in the band during transmission of all multiple channel signals between amplifiers, thereby to define tilted attenuation levels corresponding to the effective spacing between successive amplifiers, an amplifier having intercoupled amplification stages operable to amplify said signals of higher frequency with more gain than said signals of lower frequency thereby to define tilted gain level, the amplifier having controllable impedance means that is (a) variable to establish a range of amplifier gain levels having different slopes at a selected pilot frequency within the band, one of said gain levels having substantially matching correspondence to an attenuation level established by the effective spacing of the amplifiers from the previous amplifier in the system, and (b) variable to change the slopes of the gain levels while maintaining the gain levels substantially fixed at the pilot frequency.

5. The system of claim 1, in which each of said amplifiers has other impedance that is variable to change the slopes of the gain levels while maintaining the gain levels substantially fixed at the pilot frequency, and a single control for said other impedance.

6. The system of claim 5, wherein said stages include transistors having input and output paths, said other impedance comprising variable capacitance connected in series with the output path of a transistor other than in the last stage of the amplifier.

7. For combination in a cable television system having a cable to transmit multiple channel television signals within a megacycle frequency band for reception by subscriber equipment, and multiple wide-band R.F. amplifiers electrically connected with the cable at spaced locations to amplify the transmitted multiple channel signals, the signals of higher frequency in the band being subject to greater attenuation than the signals of lower frequency in the band during transmission of all multiple channel signals between amplifiers, thereby to define tilted attenuation levels corresponding to the effective spacing between successive amplifiers, the improvement comprising an amplifier having intercoupled amplification stages operable to amplify said signals of higher frequency with more gain than said signals of lower frequency thereby to define tilted gain level, the amplifier having certain controllable impedance that is variable to establish a range of amplifier gain levels having different slopes at a selected pilot frequency within the band, one of said gain levels having substantially matching correspondence to an attenuation level established by the effective spacing of said amplifier from the previous amplifier in the system, and a single control for said impedance, the amplifier including other impedance that is variable to change the slopes of the gain levels while maintaining the gain levels substantially fixed at the pilot frequency, and a single control for said other impedance.

8. The amplifier of claim 7, wherein said stages include transistors having input and output paths, said controllable impedance comprising variable capacitance connected in shunt with the input path of a transistor in a stage other than the first stage of the amplifier.

9. For combination in a cable television system having a cable to transmit multiple channel television signals within a megacycle frequency band for reception by subscriber equipment, and multiple wide-band R.F. amplifiers electrically connected with the cable at spaced locations to amplify the transmitted multiple channel signals, the signals of higher frequency in the band being subject to greater attenuation than the signals of lower frequency in the band during transmission of all multiple channel signals between amplifiers, thereby to define tilted attenuation levels corresponding to the effective spacing between successive amplifiers, the improvement comprising an amplifier having intercoupled amplification stages operable to amplify said signals of higher frequency with more gain than said signals of lower frequency thereby to define tilted gain level, the amplifier having controllable impedance means that is (a) variable to establish a range of amplifier gain levels having different slopes at a selected pilot frequency within the band, one of said gain levels having substantially matching correspondence to an attenuation level established by the effective spacing of the amplifiers from the previous amplifier in the system, and (b) variable to change the slopes of the gain levels while maintaining the gain levels substantially fixed at the pilot frequency.

10. The amplifier of claim 7, wherein said stages include transistors having input and output paths, said other impedance comprising variable capacitance connected in series with the output path of a transistor other than in the last stage of the amplifier.

11. The amplifier of claim 7, wherein said stages include transistors having input and output paths, said controllable impedance comprising at least one voltage controlled capacitance diode connected in series with the input path of a transistor in a stage other than the first stage of the amplifier, said control comprising a potentiometer connected to control the voltage applied to said diode.

12. The amplifier of claim 11, including another voltage-controlled capacitance diode operable to change the slopes of the gain levels while maintaining the gain levels substantially fixed at the pilot frequency, and a potentiometer to control the voltage applied across said other diode.

References Cited

UNITED STATES PATENTS

| | | | |
|---|---|---|---|
| 2,691,074 | 10/1954 | Eberhard | 330—31 |
| 3,064,195 | 11/1962 | Freen | 330—24 X |
| 3,193,775 | 7/1965 | Herrero et al. | 330—31 |

ROY LAKE, *Primary Examiner.*

SIEGFRIED H. GRIMM, *Assistant Examiner.*

U.S. Cl. X.R.

178—70; 179—170.6, 170.8; 325—308; 330—24, 29, 31, 145, 178